(12) United States Patent
Mehr et al.

(10) Patent No.: US 8,310,662 B2
(45) Date of Patent: Nov. 13, 2012

(54) METHOD FOR DETECTING MISALIGNMENT OF A VEHICLE HEADLIGHT USING A CAMERA

(75) Inventors: Wilfried Mehr, Wolfurt (AT); Thomas Fechner, Kressbronn, DE (US); Stefan Heinrich, Achern (DE)

(73) Assignee: ADC Automotive Distance Control Systems GmbH, Lindau (DE)

( * ) Notice: Subject to any disclaimer, the term of this patent is extended or adjusted under 35 U.S.C. 154(b) by 23 days.

(21) Appl. No.: 12/994,371

(22) PCT Filed: May 12, 2009

(86) PCT No.: PCT/DE2009/000674
§ 371 (c)(1),
(2), (4) Date: Nov. 23, 2010

(87) PCT Pub. No.: WO2010/000214
PCT Pub. Date: Jan. 7, 2010

(65) Prior Publication Data
US 2011/0069303 A1    Mar. 24, 2011

(30) Foreign Application Priority Data

Jul. 3, 2008 (DE) .......................... 10 2008 031 159

(51) Int. Cl.
  *G01J 1/00* (2006.01)
(52) U.S. Cl. ....................................... 356/121; 356/138
(58) Field of Classification Search .......... 356/121–122, 356/139.1, 138, 152.1–152.3; 362/464, 465, 362/277, 282, 283, 285, 276, 418, 419, 420, 362/425, 319, 802, 514, 512, 539, 538, 523, 362/529, 525, 531, 530, 532; 250/206, 206.1; 315/81–83, 76, 77; 340/901–905, 425.5, 340/435, 436, 438, 463, 815.45, 468; 180/167–169; 701/45; 345/82
See application file for complete search history.

(56) References Cited

U.S. PATENT DOCUMENTS

| 5,193,894 A | 3/1993 | Lietar et al. |
| 5,499,168 A | 3/1996 | Cochard et al. |
| 6,144,159 A | 11/2000 | Lopez et al. |
| 6,443,603 B1 | 9/2002 | Eberhardt |
| 6,485,168 B2 | 11/2002 | Rosenhahn et al. |
| 6,990,397 B2 | 1/2006 | Albou et al. |
| 7,782,184 B2 | 8/2010 | Wittorf et al. |
| 2003/0227777 A1 | 12/2003 | Schofield |
| 2004/0052083 A1 | 3/2004 | Daicho et al. |
| 2004/0167697 A1 | 8/2004 | Albou et al. |

FOREIGN PATENT DOCUMENTS

| DE | 41 22 531 | 1/1993 |
| DE | 43 41 409 | 6/1995 |
| DE | 197 04 427 | 8/1998 |
| DE | 199 14 417 | 10/2000 |

(Continued)

OTHER PUBLICATIONS

German Search Report for German Application No. 10 2008 031 159.6, dated Apr. 29, 2009, 4 pages, with English translation, 4 pages, Muenchen, Germany.

(Continued)

*Primary Examiner* — Tri T Ton
(74) *Attorney, Agent, or Firm* — W. F. Fasse

(57) ABSTRACT

A method for detecting misalignment of a vehicle headlight using a camera system is specified. For this purpose, the headlight is in a predefined position and the camera system is arranged on or in the vehicle and is oriented in such a manner that the light distribution pattern of the headlight in front of the motor vehicle is detected. With a predefined headlight position, an actual light distribution pattern of the headlight is recorded using the camera system and is compared with a desired light distribution pattern for the predefined headlight position. If the actual light distribution pattern differs from the desired light distribution pattern, misalignment of the headlight is detected.

22 Claims, 1 Drawing Sheet

FOREIGN PATENT DOCUMENTS

| | | |
|---|---|---|
| DE | 199 16 175 | 10/2000 |
| DE | 102004052434 | 5/2006 |
| DE | 102006041857 | 4/2007 |
| DE | 603 09 278 | 5/2007 |
| DE | 102007049619 | 4/2009 |
| EP | 0 867 336 | 9/1998 |
| EP | 0 949 118 | 10/1999 |
| EP | 1 093 966 | 4/2001 |
| WO | WO 03/053737 | 7/2003 |

OTHER PUBLICATIONS

International Search Report of the International Searching Authority for International Application PCT/DE2009/000674, mailed Oct. 20, 2009, 3 pages, European Patent Office, HV Rijswijk, Netherlands.

English Translation of PCT Written Opinion of the International Searching Authority for International Application PCT/DE2009/000674, mailed Oct. 20, 2009, 6 pages, European Patent Office, HV Rijswijk, Netherlands.

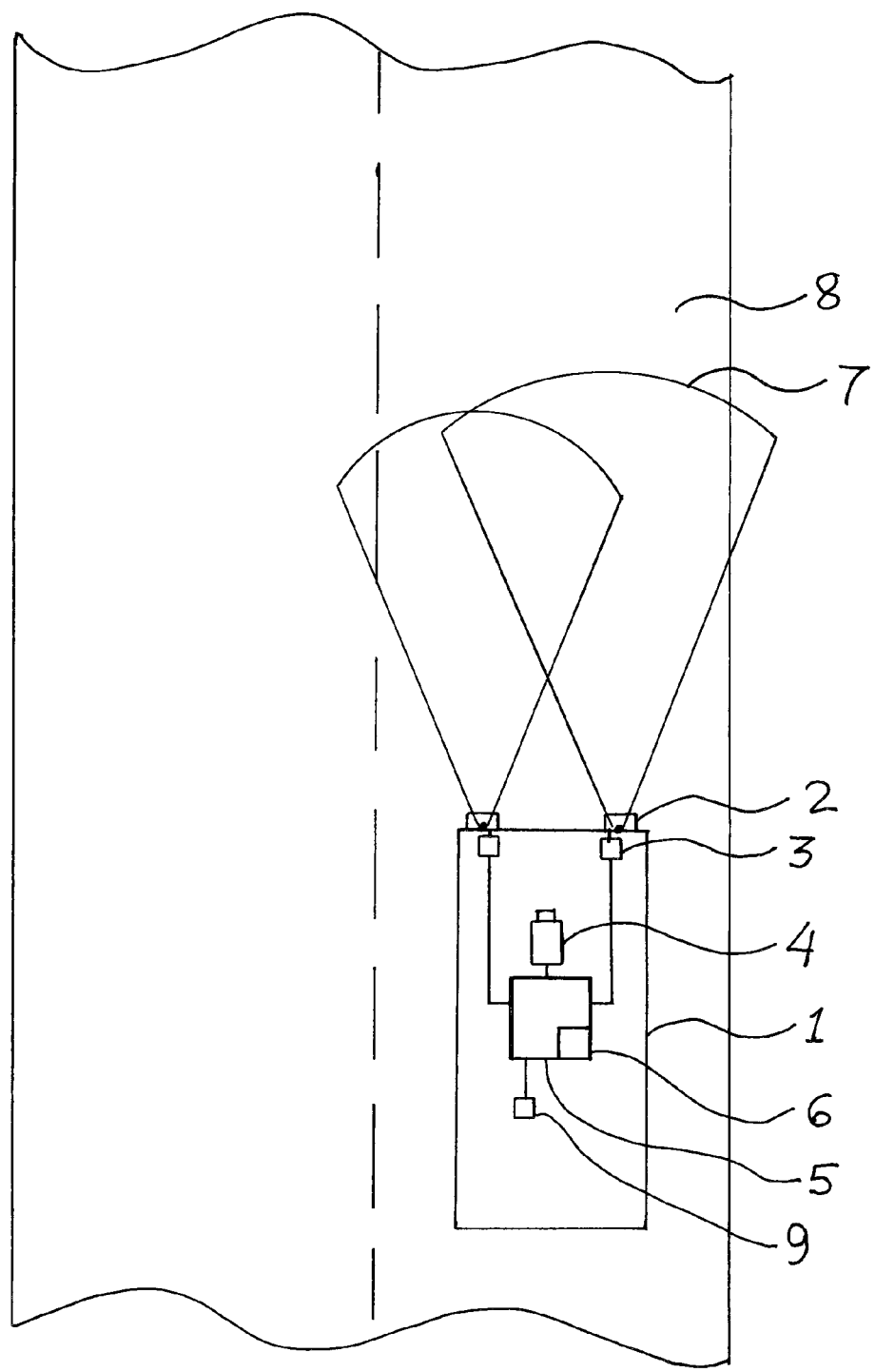

METHOD FOR DETECTING MISALIGNMENT OF A VEHICLE HEADLIGHT USING A CAMERA

FIELD OF THE INVENTION

The invention relates to a method for detecting misalignment of a vehicle headlight and prevents the unintentional dazzling of other road users. The invention introduced here is applied in any vehicle with a camera system which detects the environment in front of the vehicle and a control unit for the headlight.

BACKGROUND INFORMATION

Modern adaptive headlight systems such as e.g. high beam assistants with a gliding headlight range adapt to the current traffic conditions by changing the illumination characteristic. A camera is used in such systems to detect preceding and forthcoming vehicles and to determine their position. By means of this information the headlight can then be adjusted such that a maximum illumination takes place without dazzling the other road users. However, a misaligned headlight can lead to an unintentional dazzling, as not the predefined range is illuminated. Usually, a headlight adjustment is effected in a garage with a headlight adjusting device. It is disadvantageous with this method that a headlight adjustment is combined with time and costs for the vehicle owner.

SUMMARY OF THE INVENTION

It is, therefore, the object of the present invention to indicate a method for automatically detecting misalignment of the headlight.

For this purpose a method is indicated with a camera system, which is arranged in or on the vehicle and is oriented on a range in front of the vehicle. Preferably, the camera system is used moreover for the embodiment of a driver assistance system. The camera system detects the current beam characteristic depending on the position of a vehicle headlight. The position of the headlight is indicated e.g. by the pitch and yaw angle. Besides, a desired characteristic for the headlight beam for at least one headlight position is known. If there is a difference or deviation between the desired beam characteristic or pattern and the actual beam characteristic or pattern with a predefined headlight position, then a misalignment of the headlight is detected.

BRIEF DESCRIPTION OF THE DRAWING

In order that the invention may be clearly understood, it will now be explained in connection with an example embodiment shown in the accompanying drawing as well as further preferred embodiment features.

The single FIGURE of the accompanying drawing is a schematic top view of a motor vehicle driving on a roadway, wherein the vehicle is equipped with a system for carrying out an example of a method of detecting a misalignment of a vehicle headlight according to the present invention.

DETAILED DESCRIPTION OF EXAMPLE EMBODIMENTS OF THE INVENTION

The single drawing FIGURE schematically shows a motor vehicle 1 having two headlights 2 that illuminate the roadway 8 in front of the motor vehicle 1 and thereby form an actual light distribution pattern 7 on the roadway 8 ahead of the motor vehicle. Each headlight 2 is controllable so that its orientation can be adjusted, through the operation of a headlight control device 3 respectively connected to the headlight 2. The motor vehicle 1 is further equipped with a camera 4 that is arranged on or in the vehicle and is oriented so as to detect and record the actual light distribution pattern 7 on the roadway in front of the motor vehicle. The vehicle is further equipped with an evaluation arrangement 5 that is connected to the camera 4 and to the headlight control devices 3. The evaluation arrangement 5 includes a storage memory 6, which stores a program for executing a method of detecting a misalignment of the vehicle headlight 2 using the camera 4, according to an example embodiment of the present invention. Namely, as explained herein, the headlight 2 is in a predefined headlight position, and then the camera 4 reports the actual light distribution pattern 7 produced by the headlight 2. The recorded actual light distribution pattern 7 is then compared with a desired light distribution pattern in the evaluation arrangement 5. If the actual light distribution pattern differs unacceptably from the desired light distribution pattern, then the evaluation arrangement 5 provides a misalignment signal, which can be emitted as a haptic, acoustic and/or optical warning signal to the driver of the vehicle, by a warning signal emitter 9.

The actual beam characteristic or pattern 7 is determined in particular during operation of the vehicle 1 on a free or unobstructed road 8. If no objects are detected on the roadway 8 in front of the vehicle 1, then with a predefined headlight adjustment, e.g. idle state=zero degree (i.e. yaw angle=zero degree and pitch angle=0 degree), the light intensity visible in the camera picture is determined. In an advantageous embodiment of the invention an illuminated area with an intensity above a predefined threshold value is determined, as e.g. not the entire illuminated field of the headlight is recorded by the camera system. For increasing the measurement accuracy it is advantageous to combine several measurements and to form an average thereof, if necessary.

In an advantageous embodiment of the invention, the position of the actual light distribution pattern is evaluated with regard to a surface parallel to the vehicle longitudinal axis, in particular the roadway lane of the vehicle. This method offers the advantage that the adjustment of a headlight can be tested during the vehicle operation. In particular, the method is applied with a free roadway, if no objects are detected on the roadway. With a predefined headlight position, the light distribution pattern on the roadway is detected and is compared with a desired light distribution pattern which considers the picture of the light distribution pattern on a surface parallel to the roadway.

Alternatively, the actual light distribution can also be determined by observing the local brightness on the basis of retro-reflective objects. Retro-reflective objects are frequently used to identify the roadway boundary. Methods are known in the image processing, with the aid of which the location of an object can be estimated on the basis of image data of a mono and/or stereo camera. The brightness of retro-reflective objects in the image is proportional to the actual light irradiation at the location of the object. If necessary, with this method also the temporal brightness progression or variation of an object is considered in a picture sequence. With the known true speed of the vehicle and a local estimation for the retro-reflective objects in this way the actual light distribution pattern can be measured. This method is particularly suitable, if the light distribution pattern cannot be determined on a surface parallel to the roadway.

In a further embodiment of the invention the light distribution pattern is evaluated with regard to the lane of the vehicle.

With a linear lane, the light distribution pattern of a headlight is symmetrical to the course of the lane. Thus, in this embodiment the accurate or exact viewing direction of the camera system does not need to be known, if the course of the lane is known in the camera picture. The detection of a lane from image data is state of the art and is already implemented in lane keeping systems.

In a further positive embodiment of the invention the light distribution is determined with regard to the vehicle longitudinal axis, in which at first the visual vanishing point of objects is determined in the video picture (FOE, focus of expansion) during the trip. The visual vanishing point results in particular from the movement trajectories of objects, e.g. roadway markings, forthcoming vehicles etc. Objects which are far away are detected first in the vanishing point or close to it and move into other picture areas when approaching. From the position of the visual vanishing point in the camera picture and if applicable of the movement trajectories of objects in particular when driving straight ahead the direction of movement of the vehicle and thus the position of the vehicle longitudinal axis can be suggested.

In a further embodiment of the invention the position of the actual light distribution pattern is recorded when the vehicle stands in front of a surface that is oriented perpendicular or vertical to the vehicle longitudinal axis. In this case the method for detecting misalignment can be performed e.g. in front of a house or garage wall. The method can be performed, for example, automatically or when desired by the driver, when the vehicle is at a standstill before the start or after the end of a trip.

In a further embodiment of the invention the headlight radiates a special light distribution pattern for detecting the misalignment. In particular, the light pattern is predefined in such a manner that a central portion of the headlight darkens and/or light is radiated only in a central portion. This central portion is e.g. circular or rectangular.

In a special embodiment of the invention, for carrying out a comparison, a desired light distribution pattern is selected from among plural stored patterns depending on the form of the actual light distribution pattern. This is in particular of importance if the actual light distribution pattern is detected on a surface, which can be arranged parallel or perpendicular to the vehicle longitudinal axis. For example, the projection of the actual light distribution is recorded on the roadway or on a wall perpendicular to the vehicle longitudinal axis. The course or progression of the actual light distribution is different in these two cases and must, therefore, be compared with different desired light distribution patterns.

In a preferred embodiment of the invention a warning signal is given when a misalignment is detected to advise the driver of the misalignment. The warning signal can be emitted optically, acoustically and/or haptically by a corresponding warning signal emitter 9.

In a further embodiment of the invention a headlight calibration for at least two predefined headlight positions is performed when a misalignment is detected, so that the actual light distribution complies with the desired light distribution. In a further embodiment of the invention a headlight calibration for at least two predefined headlight positions is automatically performed when a misalignment is detected and a calibration is requested by the driver. The calibration request by the driver can be effected for example by an input device inside the vehicle.

The invention claimed is:

1. A method for detecting a misalignment of a vehicle headlight of a motor vehicle using a camera system, wherein the headlight comprises a headlight light emitter that emits light which provides an illuminated field of view in front of the motor vehicle for vision of a driver of the motor vehicle during normal driving operation of the motor vehicle on a roadway, for detecting a misalignment of the headlight light emitter, the headlight light emitter is nominally positioned in a predefined headlight position and is operated to emit light in an actual light distribution pattern in front of the motor vehicle, and the camera system is arranged on or in the vehicle and is oriented in such a manner that the actual light distribution pattern of the headlight light emitter in front of the motor vehicle is detected by the camera system, the actual light distribution pattern of the headlight light emitter is recorded using the camera system and is compared with a desired light distribution pattern for the predefined headlight position, and if the actual light distribution pattern differs from the desired light distribution pattern, then thereby the misalignment of the headlight is detected.

2. A method according to claim 1, wherein the actual light distribution pattern is detected based on a position of an illumination range with an intensity above a predefined threshold value in a picture recorded by the camera system.

3. A method according to claim 1, wherein the actual light distribution pattern is detected based on a brightness of retro-reflective objects in at least one picture recorded by the camera system.

4. A method according to claim 1, wherein a position of the actual light distribution pattern is evaluated with regard to a surface parallel to a vehicle longitudinal axis of the motor vehicle, in particular a lane of the motor vehicle on the roadway.

5. A method according to claim 1, wherein a position of the actual light distribution pattern is evaluated with regard to a visual vanishing point in a video picture recorded by the camera system.

6. A method according to claim 1, wherein a position of the actual light distribution pattern is recorded when the motor vehicle stands in front of a surface perpendicular to a vehicle longitudinal axis of the motor vehicle.

7. A method according to claim 1, wherein for the detecting of the misalignment, the headlight light emitter radiates a special light distribution pattern as the actual light distribution pattern, which is different from the illuminated field of view provided by the headlight light emitter during the nominal driving operation.

8. A method according to claim 1, wherein for the comparing, the desired light distribution pattern is selected from among available patterns depending on a form of the actual light distribution pattern.

9. A method according to claim 1, further comprising emitting a warning signal when the misalignment is detected.

10. A method according to claim 1, further comprising performing a headlight calibration for at least two predefined headlight positions when the misalignment is detected.

11. A method according to claim 1, further comprising performing a headlight calibration for at least two predefined headlight positions when the misalignment is detected and the headlight calibration is requested by the driver.

12. A motor vehicle with a device for detecting misalignment of a headlight, comprising a controllable headlight comprising a headlight light emitter that emits light which provides an illuminated field of view in front of the motor vehicle for vision of a driver of the motor vehicle during normal driving operation of the motor vehicle on a roadway, a control device adapted to control the headlight, a camera system, which is arranged on or in the motor vehicle and is oriented in such a manner that a light distribution pattern of the headlight light emitter in front of the motor vehicle is detected, and an evaluation unit, which is connected with the control device and the camera system, and which stores a program for executing a method for detecting a misalignment of the vehicle headlight using the camera system, wherein for detecting the misalignment, the headlight light emitter is nominally positioned in a predefined headlight position and is operated to emit light in an actual light distribution pattern in front of the motor vehicle, and the camera system is arranged on or in the vehicle and is oriented in such a manner that the actual light distribution pattern of the headlight light emitter in front of the motor vehicle is detected by the camera system, wherein the actual light distribution pattern of the headlight light emitter is recorded using the camera system and is compared with a desired light distribution pattern for the predefined headlight position, and wherein if the actual light distribution pattern differs from the desired light distribution pattern, then thereby the misalignment of the headlight is detected.

13. A method of detecting a misalignment of a headlight of a motor vehicle, wherein said headlight includes a headlight light emitter that emits light which provides an illuminated field of view in front of said motor vehicle for vision of a driver of said motor vehicle during normal driving operation of said motor vehicle on a roadway, said method comprising the steps:

a) emitting light from said headlight light emitter positioned nominally at a predefined position and, with said light, illuminating an environment in front of said motor vehicle and thereby forming an actual light distribution pattern of said light emitted from said headlight light emitter on at least one surface in said environment;

b) using a camera mounted in or on said motor vehicle, recording said actual light distribution pattern of said light on said at least one surface in said environment;

c) comparing said actual light distribution pattern with a previously stored desired light distribution pattern;

d) detecting that a misalignment of said headlight exists in response to said comparing having determined that said actual light distribution pattern differs unacceptably from said desired light distribution pattern; and e) when said misalignment has been detected, issuing a misalignment signal.

14. The method according to claim 13, wherein said actual light distribution pattern is a light distribution pattern of said light emitted from said headlight light emitter during said normal driving operation of said motor vehicle on said roadway to provide said illuminated field of view for said driver of said motor vehicle.

15. The method according to claim 13, wherein said actual light distribution pattern is a special test light distribution pattern in which a central area of said headlight light emitter is darkened or in which light is emitted only from a central area of a full area of available light emission of said headlight light emitter.

16. The method according to claim 13, wherein said recording of said actual light distribution pattern comprises recording only an illuminated area of said actual light distribution pattern that has an illumination intensity above a predefined intensity threshold value, and determining a position of said illuminated area.

17. The method according to claim 13, further comprising driving said motor vehicle along said roadway and detecting whether any objects are present on said roadway ahead of said motor vehicle, wherein said steps a) and b) are carried out while said motor vehicle is driving along said roadway and no objects are detected on said roadway ahead of said motor vehicle, and wherein said at least one surface is a surface of said roadway.

18. The method according to claim 17, wherein said step c) comprises determining a position of said actual light distribution pattern relative to a longitudinal axis of said motor vehicle.

19. The method according to claim 17, wherein said recording of said step b) produces a video image of said actual light distribution pattern, wherein said method further comprises determining a visual vanishing point in said video image by a focus of expansion (FOE) procedure or by tracking movement trajectories of objects in said video image, and wherein said step c) comprises determining a position of said actual light distribution pattern relative to said visual vanishing point in said video image.

20. The method according to claim 13, wherein said misalignment signal comprises a warning signal that is emitted optically, acoustically or haptically or by a combination thereof to warn said driver of said motor vehicle that said misalignment has been detected.

21. The method according to claim 13, further comprising automatically adjusting an orientation of said headlight relative to said motor vehicle in response to at least said misalignment signal.

22. The method according to claim 13, wherein said comparing in said step c) is carried out in and using an evaluation arrangement mounted in or on said motor vehicle.

* * * * *